United States Patent [19]

Mashimo et al.

[11] 4,137,541
[45] Jan. 30, 1979

[54] AUTOMATIC EXPOSURE CONTROL APPARATUS FOR A SINGLE LENS REFLEX CAMERA

[75] Inventors: Yukio Mashimo, Tokyo; Masanori Uchidoi, Yokohama; Masayoshi Yamamichi, Kawasaki; Fumio Ito, Yokohama; Tokuichi Tsunekawa, Yokohama; Tadashi Ito, Yokohama, all of Japan

[73] Assignee: Canon Kabushiki Kaisha, Tokyo, Japan

[21] Appl. No.: 619,456

[22] Filed: Oct. 3, 1975

[30] Foreign Application Priority Data

Oct. 7, 1974 [JP] Japan ................................ 49/115305
Dec. 23, 1974 [JP] Japan ................................ 49/147842

[51] Int. Cl.² .......................................... G03B 7/08
[52] U.S. Cl. ................................ 354/23 D; 354/38; 354/50; 354/60 A
[58] Field of Search ............. 354/23 D, 50, 51, 60 R, 354/60 A, 38, 43

[56] References Cited

U.S. PATENT DOCUMENTS

| | | | |
|---|---|---|---|
| 3,842,587 | 10/1974 | Strauss et al. | 354/23 D |
| 3,909,137 | 9/1975 | Kisanuki | 354/23 D |
| 3,928,858 | 12/1975 | Sa Kurada et al. | 354/23 D |
| 4,054,887 | 10/1977 | Holle et al. | 354/23 D |

FOREIGN PATENT DOCUMENTS 2316261 10/1974 Fed. Rep. of Germany ........ 354/23 D

*Primary Examiner*—Russell E. Adams
*Attorney, Agent, or Firm*—Toren, McGeady and Stanger

[57] ABSTRACT

An automatic exposure control apparatus for controlling the diaphragm of the camera in accordance with the preselected shutter time and the exposure value, in which a digital-to-analog converter having a counter responsive to the number of pulses supplied from a clock pulse generator through a gate produces a time variable output capable of attaining a certain level dependent upon the preselected shutter time and a light value as photoelectrically sensed, that is, an exposure value and, which is detected by a first comparator. The output of the first comparator is applied to the gate, so that the converter is set to memorize the exposure value therein. As the diaphragm presetting ring is moved from the maximum to minimum aperture position with production of a time variable output from a signal generator associated therewith, a second comparator responsive to the attainment of the time variable output of the signal generator to a level dependent upon the final output of the set converter produces an output which is applied to arresting means for the diaphragm presetting ring. This results in automatic adjustment of the position of the presetting ring. At the time the presetting ring begins to move, the diaphragm driving means is actuated causing the diaphragm means to be brought into engagement with the ring. Thus, an effective exposure aperture is established in the diaphragm means.

13 Claims, 11 Drawing Figures

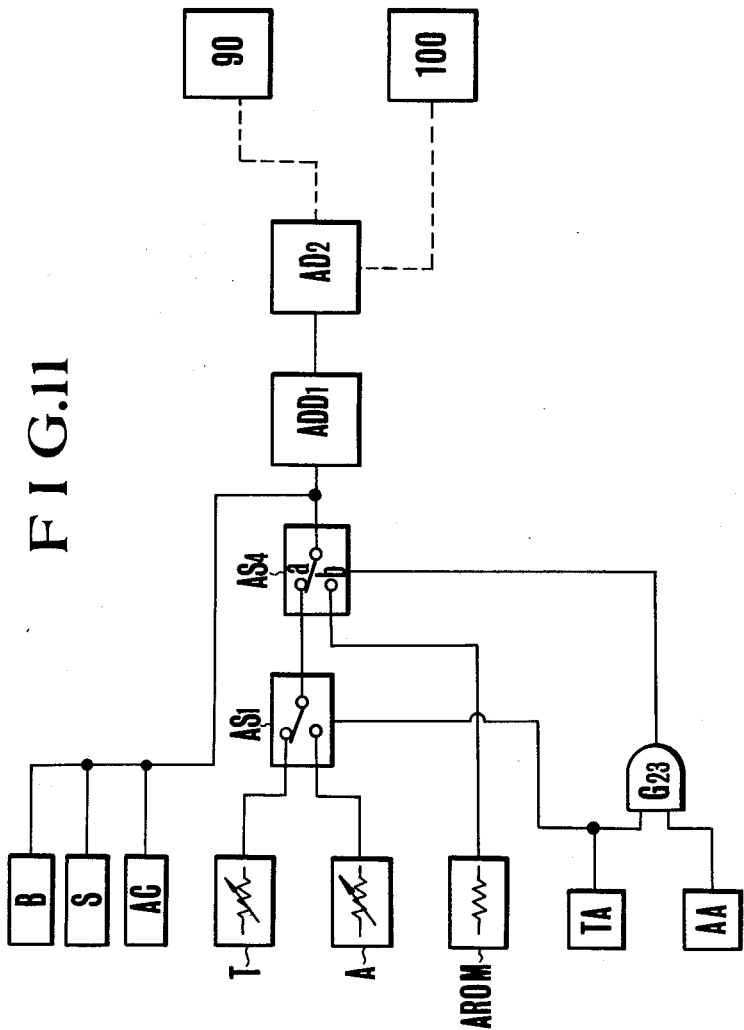

AUTOMATIC EXPOSURE CONTROL APPARATUS FOR A SINGLE LENS REFLEX CAMERA

BACKGROUND OF THE INVENTION

1. Field of the Invention

This invention relates to automatic exposure control apparatus for single lens reflex cameras of the type in which the light metering is effected with the full-size aperture of the objective lens, and, more particularly, to an automatic exposure control apparatus having a digital-to-analog converter as a memory means in combination with first and second comparator for controlling the diaphragm of the camera in accordance with the preselected shutter time and the exposure value.

2. Description of the Prior Art

The prior art provides an automatic exposure control apparatus for a single lens reflex camera of the type described in which information representative of a preselected shutter time is combined with information representative of the level of brightness of a scene being photographed by a computer an output is produced which is utilized in adjusting the position of the diaphragm presetting ring, and, thereafter, the diaphragm means is driven for engagement with the presetting ring. In this manner an effective exposure aperture is automatically established in the diaphragm means. In photographic applications requiring highly accurate and reliable automatic exposure control, for example, snap-photography, however, it is desirable to eliminate or minimize the time lag existing between the adjustment of the diaphragm presetting ring and the actuation of the diaphragm driving means.

Accordingly an object of the present invention is to provide an improved automatic exposure control apparatus for a single lens reflex camera of the type described.

Another object of the invention is to provide an automatic exposure control apparatus constructed with the use of a digital-to-analog converter in combination with two comparators for permitting simultaneous actuation of the diaphragm control means and diaphragm drive means to minimize the time interval between the release of the camera and the actuation of the shutter thereof.

Still another object of the invention is to provide an automatic exposure control apparatus from which a design flexibility is derivable for facilitating the realization of broadened photographic capabilities.

Another object of the invention is to provide an automatic exposure control apparatus for a camera of the type described and having a shutter preselection exposure range and a diaphragm preselection exposure range.

Other objects and features of the invention will become apparent from the following detailed description taken in conjunction with the accompanying drawings in which:

BRIEF DESCRIPTION OF THE DRAWINGS

FIG. 11 is a block diagram showing an example of modification of the embodiment of FIG. 5.

DESCRIPTION OF THE PREFERRED EMBODIMENTS

Figure 1:
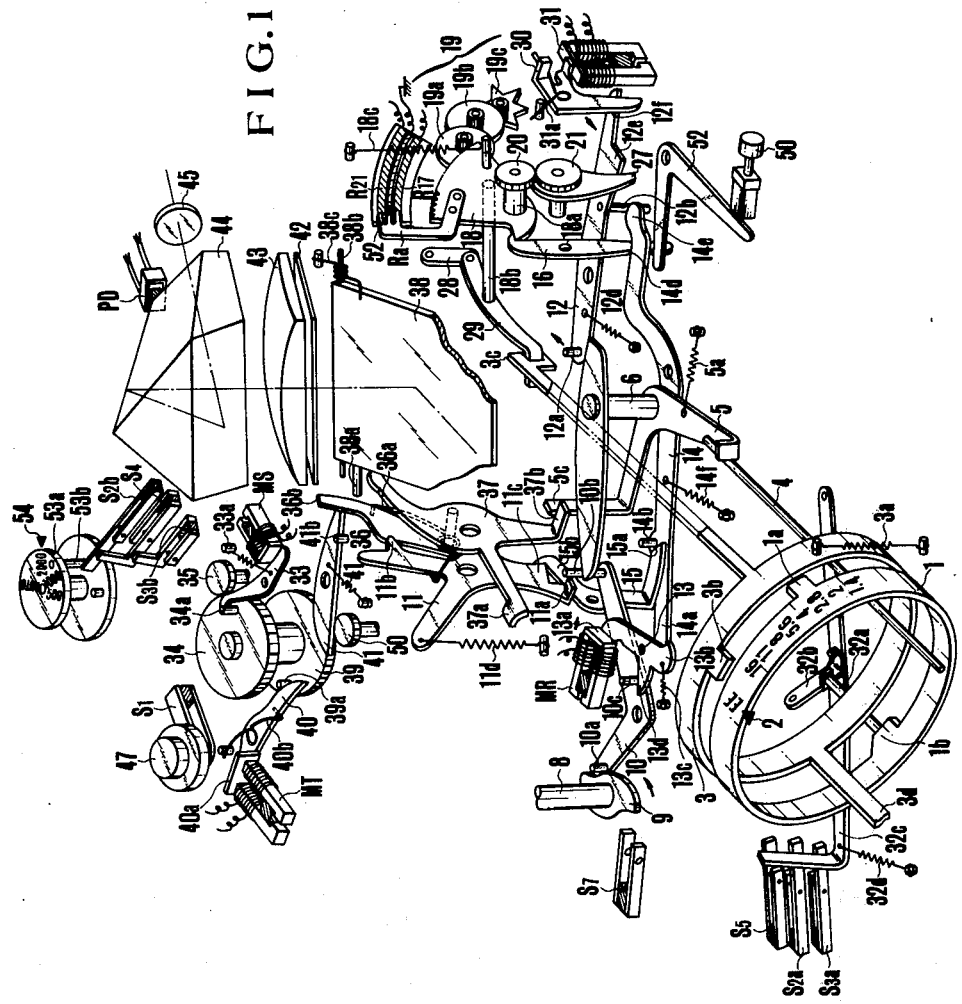
FIG. 1 is an exploded perspective view of the essential parts of one embodiment of an automatic exposure control apparatus according to the present invention as applied to a single lens reflex camera.
Figure 2:
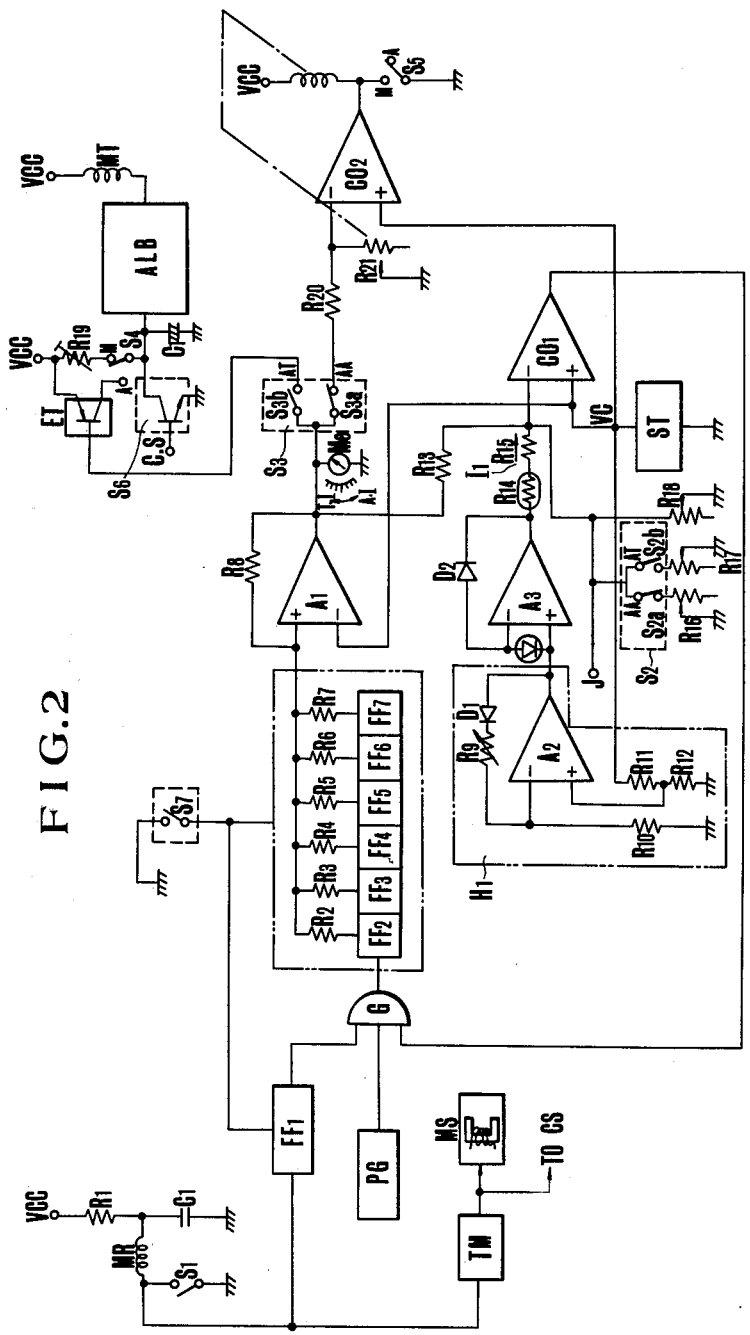
FIG. 2 is a schematic diagram, partially in block form, of the electrical circuitry suitable for use in the automatic exposure control apparatus of FIG. 1.
Figure 3:
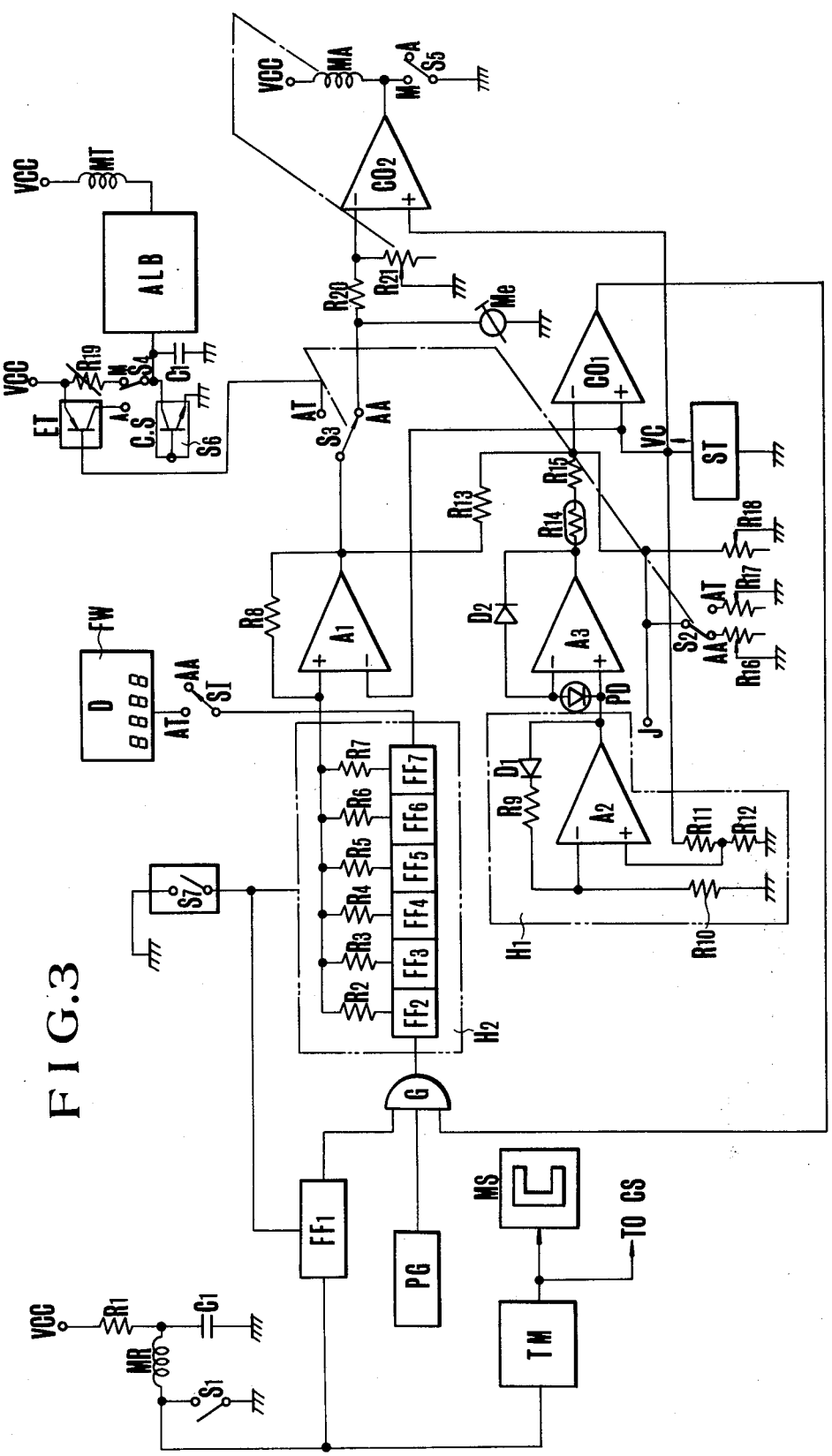
FIG. 3 is a similar diagram showing an example of modification of the embodiment with the use of displaying means.

Referring to FIGS. 1, 2 and 3, there is shown one embodiment of an automatic exposure control apparatus according to the present invention as applied to a single lens reflex camera of the type provided with a shutter preselection exposure range and with a diaphragm preselection exposure range. In FIG. 1, there is shown an arrangement of the basic mechanisms of the camera which is assumed to be in the film-wound and shutter-cocked position. The camera essentially comprises a lens aperture mechanism mounted in an individual interchangeable objective lens barrel, a diaphragm control mechanism for adjusting the lens aperture mechanism to a manually preselected or automatically determined setting, a mirror mechanism movable between the viewing and non-viewing positions, a shutter mechanism, a release mechanism and a film winding mechanism, each of which will be described in detail below.

The lens aperture mechanism comprises a manually rotatable diaphragm preselecting ring 1 having cut thereon a symbol EE indicative of the automatic diaphragm control exposure range and a diaphragm scale of which graduations can be brought into registry with a stationary index 2 and having a stop lug 1a and a cam lobe 1b, and an automatically rotatable diaphragm presetting ring 3 which is biased by a spring 3a in a clockwise direction and which has a lug 3b movable into engagement with the stop lug 1a. The cam lobe 1b has a follower pin 32a provided in the lens barrel and arranged so that when the lens barrel is attached to the camera body, the opposite end of pin 32a to that engaging the cam lobe 1b is brought into abutting engagement with an extension of a one-armed lever 32b provided in the housing not shown of the camera. The diaphragm presetting ring 3 is provided with first and second arms 3c and 3d which extend parallel to the optical axis of the objective lens rearwardly and forwardly respectively. The position of the second arm 3d determines the position of a not shown bell-crank member through a not shown cam ring, which in turn determines the amount of movement of a not shown drive ring member for the diaphragm blade assembly, thereby the size of actual aperture is finally adjusted in conformance to the preselected or automatically controlled setting of the diaphragm setting ring 3 when the drive ring member is operated to move the diaphragm blade assembly from the maximum aperture position toward the minimum aperture position. The drive ring member has a pin 4 fixedly mounted thereon and rearwardly extending parallel to the optical axis of the objective lens into the path of movement of the drive lever 5 of the diaphragm control mechanism.

The diaphragm control mechanism includes the two-armed drive lever 5 for the lens aperture mechanism pivoted about a shaft 6 and biased in a counterclockwise direction by a spring 5a which tends to urge the upwardly rectangularly bent portion 5c of the opposite arm to that engaging with the pin 4 for normally abutting engagement with a rectangularly bent portion 37b of a mirror control lever 37, an escapement 12 which serves as a resetting member for the diaphragm presetting ring 3 when the cocking mechanism of the camera is operated, and a transmission which serves to convert ever-varying angular positions of the diaphragm presetting ring 3 into corresponding amounts of displacement of a common slider 52 of a variable resistor assembly Ra with two independent resistors $R_{17}$ and $R_{21}$ within the duration of a timed interval from the time when the shutter button 47 is depressed to the time when the front curtain begins to run down to the fully open position. This transmission comprises a gear sector 18 which is fixedly mounted on a rotatable shaft 18a and which is latched in the shutter-cocked position by a pawl lever 16, a pinion 20 fixedly mounted on the shaft 18a and meshing with a gear 21 fixedly mounted on a rotatable shaft 22, an arm 27 radially extending from the shaft 22 and engaging at the free end thereof with one arm 12e of escapement 12, a diaphragm presetting ring control lever 29 pivoted at a pin on the free end portion of an arm 28, the opposite end thereof being pivotally mounted on the camera housing, and connected at the center to a pin 18 extending from gear sector 18 in eccentrically parallel relation to the shaft 18a, the free end of lever 29 bearing the end of arm 3c of diaphragm presetting ring 3 against the load of spring 3a, a governor 19 including a first gear 19a engaging with the gear segment of sector 18, a second gear 19b engaging with first gear 19a and a star wheel 19c, and an arresting lever 30 which has an iron armature 31 associated with an electromagnetically actuating device having a solenoid MA with a permanent magnet core, and which is biased by a spring 31a which tends to urge the lever 30 for counter-clockwise movement about a pivot pin thereof so that when the solenoid MA is energized to cancel the flux of magnet core thereof, the pawl of lever 30 is brought into arresting engagement with one of the teeth of the star wheel 19c.

The mirror mechanism includes a mirror 38 pivotally mounted on a pair of stub shafts 38b and positioned between the objective lens and a two curtain type focal plane shutter not shown. The mirror 38 in its viewing position as shown in the figure reflects light entering through the objective lens upwards onto a focusing screen 42 where an image of an object to be photographed is formed. Light from the image on the screen 42 is radiated upward through a condenser lens 43 into the bottom face of a penta prism 44. The prism 44 reflects the light entering the bottom face thereof to an eye-piece 45 positioned behind the exit face of prism 44, whereby the image can be viewed through the eyepiece 45. There is also shown a light value sensing element PD such as a silicon blue cell positioned adjacent the exit face of prism 44 to receive light coming from the predetermined area of the image on the focusing screen 42.

The mirror 38 is movable between the viewing and nonviewing positions by a control lever 37 pivotally mounted on a common shaft and of which the upwardly extending arm movably bears at the end portion thereof a stud 38a extending from the side of the support member of mirror 38. The mirror mechanism further includes a spring-powered drive lever 11 pivotal about the common shaft of control lever 37 and pretensioned by a spring 11d which urges the lever 11 to move counter-clockwise, and a mirror return control lever 36 which is pivoted at a pin mounted on mirror control lever 37 in eccentrically parallel relation to the common shaft thereof and which is biased by a spring 36a in a counter-clockwise direction to urge the lever 36 for engagement at an extension thereof with a pawl 11b of drive lever 11. So long as the lever 36 is engaged with the drive lever 11, the driving torque of lever 11 imparted by spring 11d is transmitted to the mirror control lever 37, and therefrom further transmitted to the diaphragm drive lever 5 through the extension 37b and extension 5c connection.

The shutter mechanism comprises a focal plane shutter having front and rear curtains not shown which operations are controlled by gears 34 and 39 respectively coaxially mounted on a common shaft and meshing with pinions 35 and 50 fixedly mounted on respective shafts of front and rear curtain drums not shown. Gears 34 and 39 are held in the cocked positions by front and rear curtain latch levers 33 and 40 respectively in engagement at their pawls with detent pins 34a and 39a respectively provided on gears 34 and 39. Latch lever 33 is biased by a spring 33a in a clockwise direction and is arranged to cooperate with a solenoid MS with a permanent magnet core in such a manner that when the solenoid MS is energized to cancel the flux of the core, an armature mounted on the tail of latch lever 33 is permitted to move away from the core under the action of spring 33a, thereby the pawl of lever 33 is disengaged from detent pin 34a. Latch lever 40 is biased by a spring 40b in a clockwise direction and is arranged to cooperate with a solenoid MT with a permanent magnet core in such a manner that when the solenoid MT is energized to cancel the flux of the core, an armature 40a mounted on the tail of latch lever 40 is permitted to move away from the core under the action of spring 40b, thereby the pawl of lever 40 is disengaged from detent pin 39a. In order to return the mirror 38 to the viewing position as soon as the rear curtain runs down to the closed position, there is provided a two-armed lever 41 which is biased by a spring 41a in a clockwise direction to urge one of the two arms for abutment with a stop pin 41b, the other arm of which extends into the path of movement of detent pin 39a of rear curtain control gear 39 at a location near the most-advanced position thereof, so that when detent pin 39a strikes the former arm of lever 41 in a counter-clockwise direction against the force of spring 41a, the latter arm of lever 41 strikes the end 36b of lever 36 to disengage the extension of lever 36 from the pawl 11b of mirror drive lever 11, thereby the control lever 37 is turned in the clockwise direction causing the mirror 38 to return to the viewing position.

The release mechanism includes a shutter release button 47, a switch $S_1$ positioned adjacent the shutter button 47 upon depression of button 47 to be closed to energize a solenoid MR with a permanent magnet core, and a first latch lever 13 carrying an armature 13a arranged to cooperate with the solenoid MR and its magnet core and which lever 13 is biased by a spring 13c in a clockwise direction so that when the solenoid MR is energized to cancel the flux of the core, the first latch lever 13 is turned clockwise to disengage a pawl 13b of lever 13 from end 14a of a release lever 14 which is biased by a spring 14f in a counter-clockwise direction. The release lever 14 is arranged upon actuation or disengagement from first latch lever 13 to release the mirror drive lever 11 and diaphragm control gear sector 13 from their cocked or latched positions through the respective intermediaries including second and third latch levers 15 and 16 respectively. The second latch lever 15 has a tapered portion 15a formed on the end of a rectangularly bend portion of one arm thereof and arranged for normal abutment with a pin 14b mounted on the release lever 14, and has a pawl 15b formed on the end of the other arm thereof and arranged to be brought into engagement with a projection 11c of mirror drive lever 11 when the cocking mechanism is operated. The third latch lever 16 is arranged for abutting engagement at its tail with the one arm 14d of release lever 14 cooperating with the second latch lever 15. The tail of the third latch lever 16 also engages with one arm of a transfer level 52, the other arm of which cooperates with a manually operable control knob 51.

The film winding and shutter cocking mechanism includes a shaft 8 having a film winding lever not shown mounted at the top end thereof and having a cam disk 9 coaxially fixedly mounted on the bottom end thereof, a reset switch $S_7$ having a movable contact arranged to be brought into instantaneous contact with its fixed contact each time the film winding lever is cocked, and a bell-crank lever 10 having a first pin 10a fixedly mounted on one end portion thereof and arranged to serve as a cam follower pin for the cam disk 9 and having a second pin 15b fixedly mounted on the outer end portion thereof and arranged to be engageable with one end of an intermediate lever 7 pivoted at the shaft 6, the other end of which is engaged with a pin 12a mounted on the escapement 12, so that when lever 7 is turned counter-clockwise by bell-crank lever 10, the escapement 12 is turned clockwise against the force of spring 12d until the sector 18 is set in the cocked position by the third latch lever 16 through the lever arm 27 and lever end 12e connection, and the arresting lever 30 is disengaged from the star wheel 19c against the force of spring 31a. In order to transmit the cocking movement from escapement 12 to the release lever 14, there is provided a pin 12b perpendicularly downwardly extending from escapement 12 and arranged to be engageable with the end 14e of lever 14. In order to bring the first latch lever pawl 13b into engagement with the cocked released lever 14 against the force of spring 13c, there is provided a pin 10c fixedly mounted on bell-crank lever 10 arranged to cooperate with one arm 13d of first latch lever 13. This cocking mechanism also serves as the mirror resetting mechanism through the connection of pin 10b with an extension 11a of mirror drive lever 11.

In order that the camera is selectively set to one of three operating exposure ranges, namely, a shutter preselection automatic exposure range, a diaphragm preselection automatic exposure range and manual exposure range in automatic response to operations of the diaphragm ring 1 and a shutter dial 53, there are provided first and second switch element assemblies arranged to cooperate with the diaphragm preselecting ring 1 with the shutter dial 53 respectively. The first switch element assembly comprises three switch elements $S_{2a}$, $S_{3a}$ and $S_5$ arranged to be operated by a common actuating lever 32c the switch elements $S_{2a}$ and $S_{3a}$ being closed and the switch element $S_5$ being opened when the diaphragm preselecting ring 1 is in registry at symbol EE thereof with index 2. The second switch assembly comprises three switch elements $S_{2b}$, $S_{3b}$ and $S_4$ arranged to be operated by a common actuating pin 53b extending from the shutter dial 53a, the switch elements $S_{2b}$ and $S_{3b}$ being closed and the switch element $S_4$ being in the "A" position when the shutter dial is in registry at a symbol "Auto" thereof with a stationary index 54.

FIG. 2 shows an automatic exposure control circuit associated with the solenoids MR, MA, and MT of FIG. 1. The exposure control circuit includes a temperature compensator, a light value sensor, a plurality of exposure control parameter setting variable resistors, an adder responsive to the outputs of the sensor and some of the variable resistors for producing an output which is applied to a comparator, and an AND gate connected between a clock pulse generator and a digital-to-analog converter and having a gating control input terminal connected to the output terminal of the comparator so that when a predetermined relationship between the outputs of the converter and adder has been established, the AND gate is gated off by the output of the comparator. The exposure control circuit further includes another or second comparator which, when the shutter preselection automatic exposure range is operative, is responsive to the establishment of predetermined relationship between the output of the thus-set converter and the output of a diaphragm scanning variable resistor to produce an output which energizes the solenoid MA of the diaphragm arresting mechanism, thereby the final setting of the diaphragm presetting ring 3 is effected.

The light value sensor comprises a photosensitive element PD connected between two input terminals of an operational amplifier $A_3$, and a feedback diode $D_2$ connected between the inversing input terminal and the output terminal of the operational amplifier $A_3$. Responsive to the intensity of light entering through the objective lens under the condition that the diaphragm blades are set in the maximum possible aperture position, the photosensitive element PD generates a current IP with a magnitude dependent upon the level of brightness of an object being photographed, the maximum possible aperture size (AVO) and the deviation of light value variation with aperture size from the linear relationship therebetween (AVC). This current IP is logarithmically compressed by the diode $D_2$ in cooperation with the amplifier $A_3$.

The temperature compensator enclosed by dot-and-dash lines $H_1$ comprises an operational amplifier $A_2$ with a feedback diode $D_1$ connected between the inversive input terminal and the output of amplifier $A_2$, a voltage divider containing series-connected resistors $R_{11}$ and $R_{12}$ and connected between ground and a stabilized voltage source ST supplying a voltage VC as a reference voltage, the voltage divider being connected to the non-inversive input terminal of amplifier $A_2$ at a point on the connection between resistors $R_{11}$ and $R_{12}$, and a resistor $R_{10}$ connected between the inversive input terminal of amplifier $A_2$ and having a resistance value such that a current with a magnitude equal to that of the current ip(s) flowing through the photosensitive element PD at a standard or average light level for which the perfect temperature compensation is to be effected is allowed to flow through the diode $D_1$, provided that the temperature response characteristics of the diodes $D_1$ and $D_2$ are almost identical to each other. Hence we have $$R_{10} = \frac{1}{ip(s)} \cdot \frac{R_{12}}{R_{11} + R_{12}} \cdot VC$$

The resistance values of resistors $R_{11}$ and $R_{12}$ are so adjusted to decrease the non-inversive input voltage of amplifier $A_2$ from the reference voltage VC by a magnitude equivalent to the maximum one of tolerances of values for the circuit parameters such as those of the photosensitive element PD, logarithmic compression diode $D_2$ and temperature compensation diode $D_1$ and the lens parameters of the objective lens of the camera within which the circuit parts and lens parts may be manufactured economically while nevertheless permitting the production of a completed exposure control apparatus of good performance. For adjustment of the output voltage $VA_2$ of amplifier $A_2$ to a level such that the output voltage $VA_3$ of amplifier $A_3$ is equal to the reference voltage VC at the standard light level when the level of the non-inversive input of the first comparator $CO_1$ is VC, there is provided a variable resistor $R_9$ connected in series with the feedback diode $D_1$ of amplifier $A_2$. Hence, we have;

$$VA_2 = \frac{R_{12}}{R_{11} + R_{12}} \cdot Vc + R_9 \cdot ip(s) +$$

$$\frac{kT}{q} \ln \left( \frac{ip(s)}{io(T)} + 1 \right)$$

$$VA_3 = VA_2 - \frac{kT}{q} \ln \left( \frac{ip}{io(T)} + 1 \right)$$

At the standard light level for which the perfect temperature compensation is made;

$$VA_3 = VA_2 - \frac{kT}{q} \ln \left( \frac{ip(s)}{io(T)} + 1 \right) =$$

$$\frac{R_{12}}{R_{11} + R_{12}} \cdot VC + R_9 \cdot ip(s)$$

In order to effect satisfactory temperature compensation over the entire range of light levels which may be encountered with the exposure control apparatus, there is provided a resistor $R_{14}$ having a positive temperature coefficient and connected between the output terminal of amplifier $A_3$ and a balancing resistor $R_{15}$. When the temperature coefficient of the combined resistors $R_{14}$ and $R_{15}$ is equal to 1/T, wherein T is the absolute temperature, the current $I_1$ flowing through the resistor $R_{14}$ is maintained constant at any light level in the photographable range despite of variation of ambient temperature. Alternatively such a temperature compensation can be made by selecting a diode having temperature response characteristics K times those of the diode $D_2$ for employment as the diode $D_1$.

$$D_1 : VD_1 = \frac{kT}{q} \ln \left( \frac{ip}{io(T)} + 1 \right)$$

-continued
$$D_2 : VD_2 + \frac{kT}{q} \ln \left( \frac{ip}{io(T)} + 1 \right)$$

By proper selection of the value of parameter K, it is possible to optimize the function of the resistor $R_9$ in compensating the temperature effect on the output of the sensor.

The exposure control parameter setting circuit comprises three variable resistors $R_{16}$, $R_{17}$ and $R_{18}$ connected in parallel with each other and with the balancing resistor $R_{15}$. The resistor $R_{16}$ is associated with the shutter dial 53 of FIG. 1 upon preselection of a shutter time on the shutter dial 53 to produce an analog signal with a magnitude proportional to the APEX value of the preselected shutter time. The resistor 17 is associated with the diaphragm preselecting ring 1 upon preselection of an aperture value on the ring 1 to produce an analog signal with a magnitude proportional to the APEX value of the preselected aperture value. The resistor 18 is provided for introducing to the circuit the sensitivity of the used film, the F-number (AVO) and aperture correction factor (AVC) of the individual objective lens. The resistors $R_{16}$ and $R_{17}$ are connected to the resistor $R_{15}$ through the switch elements $S_{2a}$ and $S_{2b}$ respectively.

The digital-to-analog converter $H_2$ comprises six flip-flops $FF_2$ through $FF_7$ arranged to constitute a binary counter and six resistors $R_2$ through $R_7$ connected between a common output terminal and respective outputs of flip-flops $FF_2$ through $FF_7$ and having respective resistance values successively differing from each other by a factor of two. The converter $H_2$ is connected to a pulse generator PG through an AND gate G to which is also connected a flip-flop $FF_1$. The flip-flop $FF_1$ has a "set" input terminal connected to one end of the solenoid MR which is connected to the switch $S_1$ and has a "reset" input terminal connected to the switch $S_7$ so that when the switch $S_1$ is closed to energize the solenoid MR with the power supplied from a capacitor $C_1$, the flip-flop $FF_1$ is set to produce an output which is applied to one input terminal of the gate G, and then the flip-flops $FF_2$ through $FF_7$ are set to a counting state by the output of the first comparator $CO_1$ to produce an analog signal with a magnitude proportional to an exposure value derived from the adder, as the output of the converter $H_2$ is applied through a buffer amplifier $A_1$ and a balancing resistor $R_{13}$ to the inversive input terminal of the first comparator $CO_1$, thereby the exposure value is stored in the digital form on the converter $H_2$ until the switch $S_7$ is closed to reset the converter $H_2$. The output terminal of buffer amplifier $A_1$ is connected to a meter ME in which the position of the deflected pointer is representative of an effective exposure aperture in cooperation with an aperture scale AI when the shutter preselection exposure range is operative, and of an effective exposure time in cooperation with a time scale TI when the diaphragm preselection exposure range is operative.

With the camera set in the shutter preselection automatic exposure range, the output terminal of the buffer amplifier $A_1$ is connected through the closed switch element $S_{3a}$ and a resistor $R_{20}$ to the inversive input terminal of a second comparator $CO_2$, the non-inversive input terminal of which is connected to the stabilized voltage source ST. Connected in parallel with the resistor $R_{20}$ is a variable resistor $R_{21}$ associated with the scanning device of FIG. 1, so that when a predetermined relationship between the magnitudes of the signals from the resistors $R_{20}$ and $R_{21}$ is established, the second comparator $CO_2$ begins to energize the solenoid MA, as the switch $S_5$ is opened or in the "A" position, thereby the diaphragm presetting ring 3 which is moving is arrested at a position for providing the effective exposure aperture with the diaphragm blade assembly which is simultaneously operated by the drive lever 5.

With the camera set in the diaphragm preselection automatic exposure range, the output terminal of buffer amplifier $A_1$ is cut off from the second comparator, and instead is connected through the closed switch element $S_{3b}$ to the base electrode of a transistor ET having a logarithmic extension function. The transistor ET constitutes a timing circuit together with a timing capacitor $C_1$ when the switch $S_4$ arranged between the transistor ET and capacitor $C_1$ is closed or in its "A" position. Connected across the capacitor $C_1$ is a semi-conductor switch $S_6$ which is opened when a control signal is applied to the base electrode thereof.

A switching circuit ALB such as a Schmitt type trigger circuit responsive to the output voltage from the timing circuit is provided for energizing the solenoid MT controlling the termination of actuation of the shutter of the camera. When the switch $S_4$ is set in the "M" position where the manual exposure range is operative, the switching circuit ALB is responsive to another timing circuit containing a variable resistor $R_{19}$ and the timing capacitor $C_1$ connected in series with each other through the closed switch $S_4$. The variable resistor $R_{19}$ is associated with the shutter dial so that a shutter time preselected on the shutter dial is introduced to the variable resistor $R_{19}$, as in the case of the variable resistor $R_{16}$.

The switching control input terminal CS of the semi-conductor switch $S_6$ is connected to the output terminal of a delay circuit TM having an input terminal connected to the switch $S_1$. The time constant of the delay circuit TM is such that the upward pivoting movement of the reflex mirror 38 and the closing movement of the diaphragm blades from the maximum possible aperture position to the minimum aperture position have been completed before the front shutter curtain begins to run down to the fully open position. At the termination of duration of a time interval determined by delay circuit TM, the solenoid MS is energized by the output from delay circuit TM, and at the same time the semi-conductor switch $S_6$ is rendered conducting by the output therefrom to short-circuit the timing capacitor $C_1$.

FIG. 3 shows an example of modification of the exposure control circuit of FIG. 2 as being made at the display system in which there is provided a digital display device D in addition to the analog display device or meter ME arranged so that when the diaphragm preselection automatic exposure range is operative, the digital display device displays the derived exposure value in the form of the digital number of exposure time, while the meter ME displays the preselected aperture value in cooperation with the aperture value scale AI. Although the circuit of FIG. 3 is illustrated in the position for the shutter preselection automatic exposure range, the digital display device D is connected to the binary counter of the digital-to-analog converter $H_2$ when the switch $S_1$ is set in the "AT" position for the diaphragm preselection automatic exposure range. The switch $S_1$ is arranged to operate synchronously with the switches $S_2$ and $S_3$. Operation:

The exposure control apparatus of FIGS. 1 and 2 is assumed to be in the shutter-cocked position with the control knob 51 being pulled out and being locked in position by click means. Further assuming that the variable resistor $R_{18}$ has been adjusted in accordance with the sensitivity of the associated film and the F-number and aperture correction factor of the associated interchangeable objective lens, and the voltage source VCC has been made effective.

For making an exposure in the shutter preselection automatic exposure range, the camera operator may turn the shutter dial 53a to place a desired shutter time in registry with the index 54 and the diaphragm preselecting ring 1 to place the symbol EE in registry with the index 2 as shown in FIG. 1, causing the cam follower pin 32a to ride on the cam lobe 1b, thereby switch elements $S_{2a}$ and $S_{3a}$ are closed and switch element $S_5$ is opened. Next, the camera is aligned with an object to be photographed, so that a portion of the light entering through the objective lens is received by the photosensitive element PD. Responsive to the output of photosensitive element PD, the operational amplifier $A_3$ produces an output signal with a magnitude proportional to the logarithm of the object brightness level which is then applied to the first comparator $CO_1$ in combination with the signals supplied from the variable resistors $R_{16}$ and $R_{18}$. When the shutter button 47 is depressed to close switch $S_1$, the solenoid MR is energized to release the armature 13a from the attracted position by the permanent magnet core, thereupon the first latch lever 13 is turned clockwise under the action of spring 13c. At the same time, the closure of switch $S_1$ causes the inversion of flip-flop $FF_1$ and the actuation of delay circuit TM, thereby the gate G is gated on to pass a pulse train from the pulse generator PG to the digital-to-analog converter $H_2$. When the output of buffer amplifier $A_1$ has reached a certain level dependent upon the derived exposure value, gate G is gated off by the output of first comparator $CO_1$, thus the derived exposure value representative of an effective exposure aperture is memorized in the converter $H_2$.

As the first latch lever 13 is turned clockwise, its pawl 13b is disengaged from the end 14a of release lever 14, permitting release lever 14 to turn counter-clockwise under the action of spring 14f. Such a turning movement of release lever 14 causes a clockwise turning movement of the second latch lever 15 and further causes a counter-clockwise turning movement of the third latch lever 16.

As the third latch lever 16 is turned counter-clockwise, its pawl is disengaged from the projection of gear sector 18 permitting sector 18 to move clockwise under the action of spring 3a which overcomes the force of spring 18c connected between sector 18 and the camera housing. Such a turning movement of sector 18 causes a sliding movement of the common slider RA on the arcuate resistance track of variable resistor $R_{21}$ while varying the resistance value of variable resistor $R_{21}$. When the time variable resistance value of resistor $R_{21}$ has reached a level dependent upon the output of buffer amplifier $A_1$, that is, the derive exposure value, the second comparator $CO_2$ produces an output which energizes the solenoid MA, thereupon the arresting lever 30 is turned counter-clockwise to arrest the star wheel 19c which is ever rotating counter-clockwise. This turning movement of sector 18 also causes a downward movement of the control lever 29 which in turn causes a clockwise movement of diaphragm presetting ring 3, thereby the final angular position of ring 3 is determined in accordance with the object brightness level, the preselected shutter time and the sensitivity of the associated film.

As the second latch lever 15 is turned clockwise, the spring-powered mirror drive lever 11 is disengaged at the projection 11c from the latch lever pawl 15b, and is then turned counter-clockwise under the action of spring 11c in combination with the control lever 37 through the return control lever 36, causing the diaphragm drive lever 5 to be turned clockwise about shaft 6 through the extension 37b and extension 5c connection against the force of spring 5a, while moving the pin 4 which operates with the diaphragm blade drive ring in the lens aperture mechanism, thereby the size of actual diaphragm aperture is varied from the maximum one to a value dependent upon the angular position of the diaphragm presetting ring 3. As the control lever 37 is turned counter-clockwise, the mirror 38 is moved from its viewing position to its non-viewing position.

The above mentioned portion of the operation of the apparatus has been completed by the time after the time interval dependent upon the time constant of the delay circuit TM from the actuation thereof. At the termination of duration of the time interval, in other words, after the lens aperture mechanism has been adjusted and the mirror has been set to the non-viewing position, the solenoid MS is energized to cancel the flux of the permanent magnet core, thereby the front curtain latch lever 33 is turned clockwise under the action of spring 33a to disengage the pawl of lever 33 from detent pin 34a, permitting gear 34 to turn counter-clockwise under the action of a not shown spring while rotating pinion 35 engaging therewith to effect running-down movement of the front shutter curtain. In synchronism with the initiation of energization of solenoid MS, a control signal is applied from the delay circuit TM to the non-contact switch $S_6$, thereupon the timing circuit which is comprised of variable resistor $R_{19}$ and capacitor $C_1$ generates a time variable voltage capable of reaching a level termed the trigger voltage for the switching circuit ALB during a time interval equal to the shutter time preselected on the shutter dial. At the termination of duration of the time interval, the solenoid MT is energized to cancel the flux of the permanent magnet core thereof to turn the rear curtain latch lever 40 clockwise under the action of spring 40b, thereby the detent pin 39a is disengaged from the pawl of lever 40, permitting the gear 39 to turn counter-clockwise under the action of a not shown spring while rotating the pinion 50 to effect the running-down movement of the rear curtain, thereby the exposure is terminated. As the termination of rotation of gear 39, the detent pin 39a strikes one arm of transfer lever 41, causing lever 41 to turn counter-clockwise against the force of spring 41. Such a turning movement of lever 41 causes disengagement of mirror return control lever 36 from the projection 11b of drive lever 11 which in turn causes a clockwise turning movement of control lever 37 and causes a counter-clockwise turning movement of diaphragm drive lever 5. During this time, the mirror 38 is returned to the viewing position under the assistance of the return spring 38c. As the lever 5 is turned counter-clockwise, the pin 4 is moved to the initial position where the diaphragm blades are in the maximum possible aperture position.

After the exposure has been terminated, the film winding lever may be cocked to advance the film through the length of a frame and to set the shutter to the cocked position while turning the shaft 8 in the counter-clockwise direction indicated by the arrow. During this time, the switch $S_7$ is instantaneously closed by the edge of cam disk 9 to reset the digital-to-analog converter $H_2$, and the movement of cam disk 9 causes a clockwise movement of bell-crank lever 10, through the cam disk 9-and-follower pin 10a connection, which in turn causes a counter-clockwise movement of intermediate lever 7. The movement of lever 7 is transmitted to escapement 12 through the engagement at pin 12a with the end of lever 7, thereby escapement 12 is turned clockwise against the force of spring 12d, while turning the arm 27 clockwise about the shaft 22 in engagement with the escapement arm 12e to bring the sector 18 into latching engagement with the third latch lever pawl 16, turning the arresting lever 30 clockwise to disengage its pawl from the star wheel 19c, and turning the release lever 14 clockwise through the pin 12b and lever end 14e connection to bring the lever end 14a into engagement with the first latch lever pawl 13b. As a result, all of the shutter, diaphragm, mirror and release mechanisms are set to the initial position.

For making an exposure in the diaphragm preselection automatic exposure range, the camera operator has to push the control knob 51, causing clockwise movement of L-shape lever 52 which in turn causes counter-clockwise movement of third latch lever 16, thereby sector 18 is released turning clockwise under the action of spring 3a but against the force of spring 18c until the projection 3b of diaphragm presetting ring 3 abuts the projection 1a of diaphragm preselecting ring 1. Next, the diaphragm preselecting ring 1 is turned to place a desired aperture graduation in registry with index 2, thereby the cam lobs 1b is moved away from pin 32a causing switch elements $S_{2a}$ and $S_{3a}$ to be opened and switch element $S_5$ to be set to the "A" position, and at the same time, the variable resistor $R_{17}$ is adjusted to a setting in conformance with the preselected aperture value. Next, the shutter dial 53a is turned to place symbol "AUTO" in registry with index 54, thereby switch elements $S_{2b}$ and $S_{3b}$ are closed, and switch element $S_4$ is set to the "A" position. When the shutter button 47 is depressed to close switch $S_1$, the solenoid MR is energized to disengage first latch lever 13 from release lever 14, thereby lever 14 is turned counter-clockwise under the action of spring 14f. At the same time, the flip-flop $FF_1$ is inverted. After the exposure value representative of an effective exposure time has been derived and stored in converter $H_2$, mirror drive lever 11 is actuated to move the mirror and lens aperture mechanisms to the non-viewing position and to the adjusted aperture position respectively. At the termination of duration of the time interval dependent upon delay circuit TM, solenoid MS is energized causing the front shutter curtain to run down and also causing non-contact switch $S_6$ to be opened, thereupon the timing circuit comprised of transistor ET and capacitor $C_1$ begins to generate a time variable voltage capable of reaching a level termed the trigger voltage for the switching circuit ALB during a time interval dependent upon the output of inverter $H_2$ and which is displayed in the digital form in the case of the circuit of FIG. 3. The subsequent operation proceeds in a manner similar to that shown in connection with the shutter preselection exposure range.

For making an exposure in the manual exposure range, the operator turns the shutter dial 53a to place a desired shutter time graduation in registry with the index 2 and then the diaphragm preselecting ring 1 to place a desired aperture value graduation in registry with index 2, or the vice versa, thereby all of the mode selecting switch elements $S_{2a}$, $S_{2b}$, $S_{3a}$ and $S_{3b}$ are opened, and switch elements $S_4$ and $S_5$ are set to the "M" positions. Therefore, the diaphragm control mechanism is mechanically operated to adjust the lens aperture mechanism to a setting in conformance with the preselected aperture value, and the shutter control mechanism is rendered operative with the timing circuit comprised of variable resistor $R_{19}$ and capacitor $C_1$. When the shutter button 47 is depressed to close switch $S_1$, solenoid MR is energized to disengage first latch lever 13 from release lever 14, thereby lever 14 is turned counter-clockwise. The subsequent operation proceeds in a manner similar to that shown in connection with the diaphragm preselection automatic exposure range, except for the operation of the timing circuit $R_{19}$ and $C_1$.

It will be appreciated that the present invention provides an automatic exposure control apparatus for a camera of the type provided with a shutter preselection exposure range and with a diaphragm preselection exposure range, in which there is provided a digital-to-analog converter serving as an exposure value memory device in combination with a comparator and a gate for permitting rapid and reliable preparatory of the shutter or diaphragm control means for exposure operation prior to the initiation of exposure of the photographic film with highly accurate control thereof due to the good temperature compensation, avoidance of entrance of noises and use of electronic switches in the various actuating means except for the camera start switch $S_1$.

Figure 4:
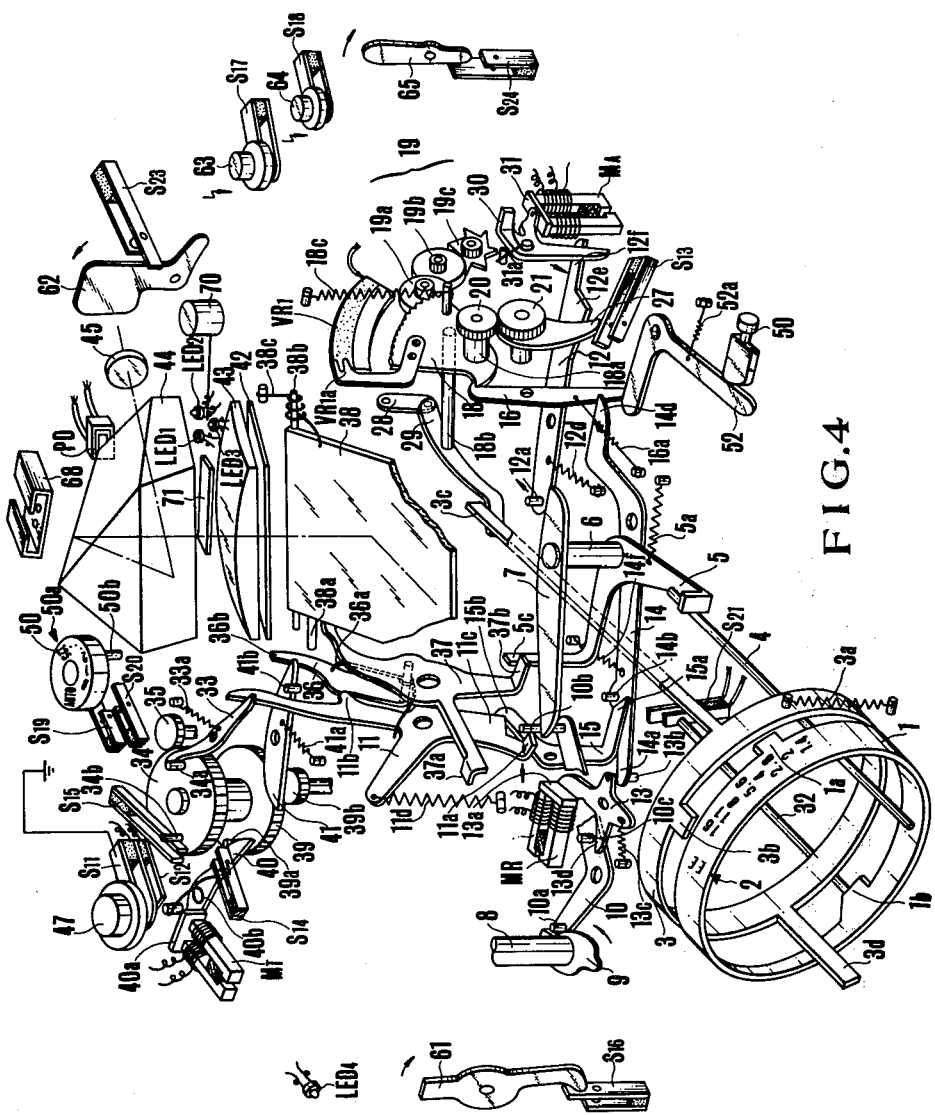
FIG. 4 is an exploded perspective view of the essential parts of another embodiment of an automatic exposure control apparatus according to the present invention as applied to a single lens reflex camera.
Figure 5:
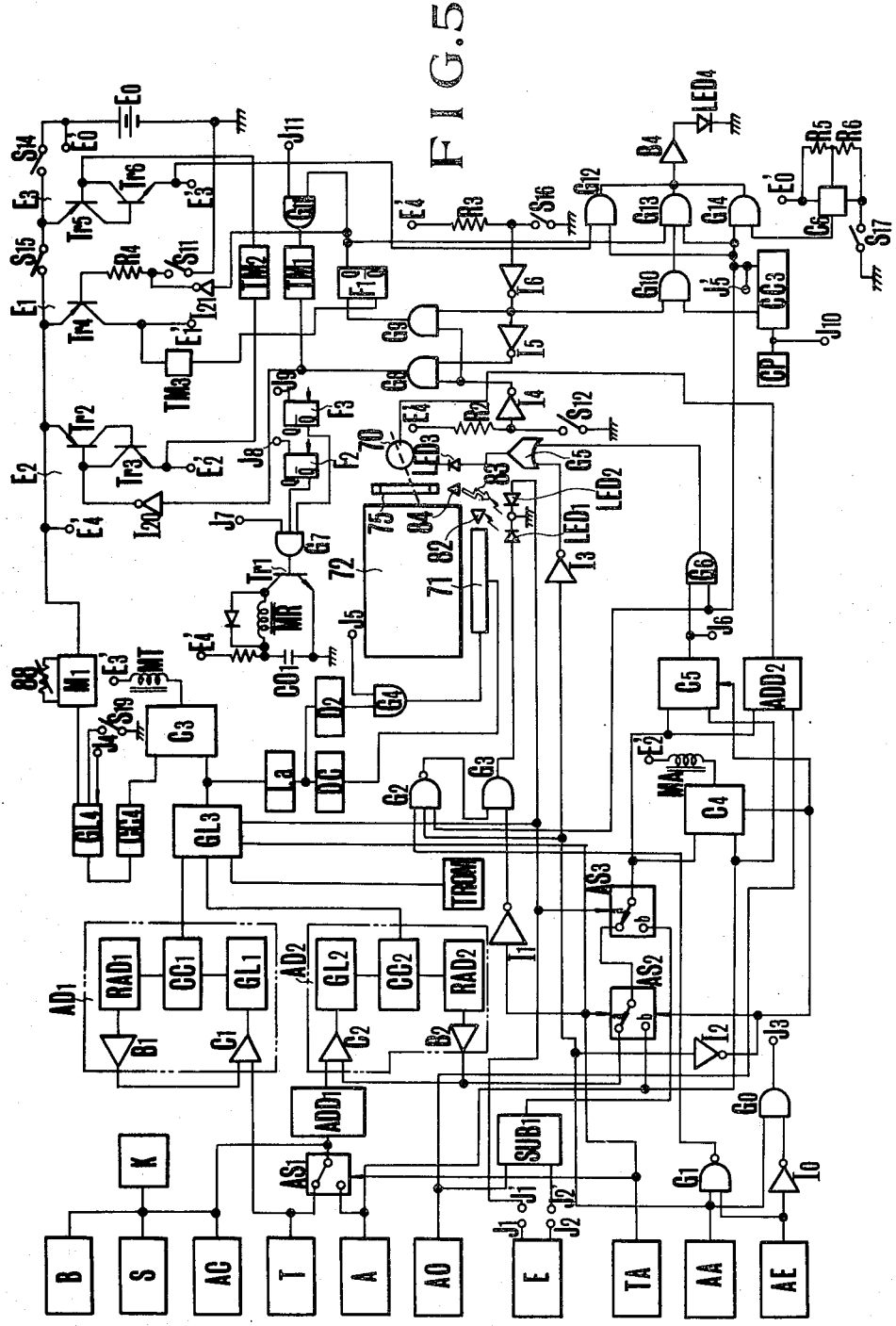
FIG. 5 is a block diagram of the circuitry suitable for use in any one of the apparatus of FIGS. 1 and 4.

Referring to FIGS. 4 and 5, there is shown another embodiment of the automatic exposure control system according to the present invention as including the essential components of the apparatus of FIGS. 1, 2 and 3 and further including other various important components which, though serve to enhance the effectiveness of the invention. FIG. 4 schematically shows a particular arrangement of the various mechanical switch elements $S_{11}$ through $S_{24}$ in the mechanisms of FIG. 1. Switches $S_{11}$ and $S_{12}$ are combined to form a single switch assembly positioned adjacent the shutter button 47 upon depression to the first and second strokes to be closed successively respectively. Switch $S_{13}$ is positioned adjacent the sector 18 resetting arm 27 to be closed when in the cocked position. Switch $S_{14}$ is cooperative with a pin 39a upwardly extending from the rear curtain control gear 39 and is closed when in the cocked position. Switch $S_{15}$ is cooperative with a pin 34b upwardly extending from the front curtain control gear 34 to serve as a count switch and as a first power supply control switch. Switch $S_{16}$ is cooperative with a self-timer control lever 61. Switch $S_{17}$ is cooperative with a battery check button 63. Switch $S_{18}$ is cooperative with an exposure multiplication control button 64. Switches $S_{19}$ and $S_{20}$ are positioned adjacent the shutter dial 50 to be closed when the shutter dial 50 is turned to place symbols "AUTO" or "B" (bulb exposure) in registry with index 50a respectively. Switch $S_{21}$ is a mode selector switch cooperative with the cam follower pin 32 for selecting either the automatically operating exposure range or the manually operating exposure range. Switch $S_{23}$ is co-operative with an eye-piece shutter 62. Switch $S_{24}$ is a second power supply control switch. There are provided four light-emitting diodes $LED_1$, $LED_2$, $LED_3$ and $LED_4$, the first three diodes of which are positioned adjacent the penta-prism 44. Positioned adjacent thereto are also a shutter time readout device 71, a diaphragm value indicator or meter 70. 68 is an accessary shoe adapted for attachment of a flash unit.

The system of FIG. 5 comprises a day-light exposure control circuit, flash exposure control circuit, display control circuit, warning signal generating circuit, self-timer circuit, power supply control circuit and battery testing circuit, each of which will be described in detail below.

The day-light exposure control circuit includes a light value sensor B, a film speed setter S, an aperture corrector AC, an exposure multiplication modifier K, all of which are connected in electrical parallelism with one another to a common input terminal of a first adder $ADD_1$ to which are also connected a shutter time setter T and a diaphragm aperture setter A in electrical parallelism with each other through a first exposure control mode change-over switch $AS_1$ of which operation is controlled by a signal from a shutter preselection responsive signal generator TA associated with switch $S_{20}$ of FIG. 4. The shutter time setter T is also connected to a comparator $C_1$ of a first analog-to-digital converter $AD_1$. The converter $AD_1$ further includes a counter $CC_1$, a ladder-type resistor network $RAD_1$ cooperative with counter $CC_1$ upon actuation of counter $CC_1$ for producing an analog signal which is applied through a buffer amplifier $B_1$ to the opposite input terminal of comparator $C_1$ to that connected to shutter time setter T, and a gate $GL_1$ having a gating control input terminal connected to the output of comparator $C_1$. Thus the analog signal from shutter time setter T is digitaled by converter $AD_1$ and stored in converter $CC_1$. The digital signal from counter $CC_1$ is applied through a gate $GL_3$ to both of a digital comparator $C_3$ and a latch circuit LA. Digital comparator controls energization of the solenoid MT controlling operation of the rear shutter curtain in a manner to be described below. When the front shutter curtain runs down to the fully open position, switch $S_{15}$ is opened causing a mono-stable multivibrator $M_1$ having a variable resistor 88 to produce an output which is applied to a gate $GL_4$, thereby gate $GL_4$ is gated on to pass a clock pulse train from a terminal $J_4$ therethrough to a counter $CC_4$ having an output terminal connected to the one input terminal of comparator $C_3$ opposite to that connected to the output terminal of gate $GL_3$. The gate $GL_4$ is provided with the switch $S_{19}$ which is closed when a bulb exposure control mode is operative and which when closed renders gate $GL_4$ inoperative to prevent application of the clock pulse train to counter $CC_4$. On the other hand, responsive to the output from gate $GL_3$, latch circuit LA causes a decoder DC to drive the digital display device 71 of five figures capable of displaying a digital number of shutter time, for example, 15, 1/125, 1/2000 sec. and the like. The display can be viewed in or near the field of view of the camera finder by the photographer looking therethrough. The output of latch circuit LA is also applied to a warning signal detector $D_2$ controlling the gating operation of a gate $G_4$ which in turn controls the power supply from a frequency divider $CC_3$ through a terminal $J_5$ to digital display device 71.

The output terminal of adder $ADD_1$ is connected to a comparator $C_2$ of a second analog-to-digital converter $AD_2$. Converter $AD_2$ further includes a counter $CC_2$, a ladder-type resistor network $RAD_2$ cooperative with counter $CC_2$ for producing an analog signal which is applied through a buffer amplifier $B_2$ to the one input terminal of comparator $C_2$ opposite to that connected to the output terminal of adder $ADD_1$ so that upon application of an output from comparator $C_2$ to a gate $GL_2$, counter $CC_2$ is set to a counting condition dependent upon the magnitude of analog signal from adder $ADD_1$ in a manner similar to that in which the first converter $AD_1$ operates. The output terminal of counter $CC_2$ is also connected to the gate $GL_3$.

The diaphragm aperture setter A having the variable resistor $VR_1$ of FIG. 4 corresponding to the variable resistor $R_{21}$ of FIG. 1 is connected to the one input terminal of a comparator $C_4$ controlling operation of the solenoid MA opposite to that connected to the output terminal of buffer amplifier $B_2$ through series-connected switches $AS_2$ and $AS_3$. Switch $AS_2$ has a pair of control input terminals, one of which is connected to the shutter preselection responsive signal generator TA and the other of which is connected through an inverter $I_2$ to a diaphragm preselection responsive signal generator AA associated with switch $S_{21}$, so that when the shutter dial 50 is set from the manually operable range to its "Auto" position, or when the diaphragm ring 1 is set from its "EE" position to its manually operable range, switch $AS_2$ is set from its "a" position to its "b" position. When the output voltage of buffer amplifier $B_2$ and diaphragm aperture setter A are brought into coincidence with each other, comparator $C_4$ produces an output which energizes solenoid MA to arrest the variable resistor $VR_1$ which is moving with variation of resistance value thereof, thereby the position of the diaphragm presetting ring 3 is adjusted to a conformance with an effective exposure aperture.

The display control circuit for displaying the absolute value of the effective exposure aperture comprises a F-number setter AO, an adder $ADD_2$ by which the informations from converter $AD_2$ and F-number setter AO are combined with each other, a meter 70 having an input terminal connected to the output terminal of adder $ADD_2$ and having a pointer arranged to be movable over a diaphragm scale plate 75 located adjacent the field of view 72 of the finder.

The warning signal generator and indicator therefor are constructed from a diaphragm auto-controllability detector AE having switch $S_{13}$, NAND gates $G_1$ and $G_2$, AND gates $G_3$ and $G_6$ an OR gate $G_5$, inverters $I_1$ and $I_3$, a comparator $C_5$, and light-emitting diodes $LED_1$ and $LED_3$. In the case of the shutter preselection automatic exposure control mode, the output of shutter preselection responsive signal generator TA is applied through inverter $I_1$ to the one input terminal of AND gate $G_3$ opposite to that connected to the output terminal of NAND gate $G_2$ to which is applied the output of diaphragm preselection responsive signal generator AA. Now assuming that the sector 18 is out of the cocked position where switch $S_{13}$ is opened, detector AE produces a warning signal representative of the incapability of automatic control of the diaphragm. When the warning signal and the output of generator AA are simultaneously applied to NAND gate $G_1$, a pulse train from the frequency divider $CC_3$ is applied through NAND gate $G_2$ to AND gate $G_3$ and therefrom to light-emitting diode $LED_1$, thereby diode $LED_1$ is intermittently lighted on behind a window 82 indicating that the shutter preselection automatic exposure control is impossible. Alternatively assuming that the sector 18 is in the latched position, generator AE produces a normal signal which when applied to NAND gate $G_1$ causes the continuous lighting of $LED_1$ by the output of AND gate $G_3$ controlled by NAND gate $G_2$. In the case of the diaphragm preselection automatic exposure control mode, the output signal of generator AA is applied through inverter $I_3$ to OR gate $G_5$ and therefrom to light-emitting diode $LED_3$, thereby diode $LED_3$ is continuously lighted on behind a window 84.

When a given photographic situation has so low light level that an under-exposure will be resulted in the shutter preselection automatic exposure range, AND gate $G_6$ is gated on by the output of comparator $C_5$ to pass the pulse train from frequency divider $CC_3$ to OR gate $G_5$ and therefrom to diode $LED_3$, thereby diode $LED_3$ is intermittently lighted on. As a result, when windows 82 and 84 are lighted on and off respectively, the photographer looking through the finder is informed that the camera is set in the shutter preselection automatic exposure range, and is further informed from the intermittent lighting of window 84 that the light level of the given photographic situation is below the dynamic range of exposure control. Conversely, when windows 82 and 84 are lighted off and on respectively, it is informed that the camera is in the diaphragm preselection automatic exposure range. In this case, when window 82 is intermittently lighted on, it is informed that the sector 18 is accidentally released from the latched position. Further when the light level of the given photographic situation is outside the dynamic range of exposure control, the digital display device 71 is caused to flicker. When the camera is set to the manual exposure range, both of windows 82 and 84 are illuminated continuously.

Gate $GL_3$ and switches $AS_1$ and $AS_2$ are synchronously operated with each other in responsive to the output from shutter preselection responsive signal generator TA in such a manner that when shutter dial 50 is set to the "AUTO" position, gate $GL_3$ is caused to pass the output of counter $CC_2$ to comparator $C_3$ but to cut off the output of counter $CC_1$ from comparator $C_3$, and switches $AS_1$ and $AS_2$ are set from their respective "a" positions to their respective "b" positions, while when shutter dial 50 is set from the "AUTO" position to the manually operable range, gate $GL_3$ is caused to pass the output of counter $CC_1$ to comparator $C_3$ but to cut off the output of counter $CC_2$ from comparator $C_3$. The output of diaphragm preselection responsive signal generator AA is applied not only to the control input of switch $AS_2$ through inverter $I_2$ but to both of the control input terminals of comparators $C_4$ and $C_5$ so that when the diaphragm ring 1 is set from its "EE" position to its manually operable range, switch AS is set from its "a" to "b" position, and comparators $C_4$ and $C_5$ are rendered inoperative.

The flash exposure control circuit responsive to the output of a flash unit E is provided for automatically controlling the size of aperture of the diaphragm of the camera and for automatically setting the shutter of the camera to a particular shutter time. The flash unit E has output terminals $J_1$ and $J_2$ and a not shown synchro-switch out terminal arranged to be connectable with respective input terminals $J'_1$ and $J'_2$ and a not shown synchro-switch input terminal provided in the camera side. The flash exposure control circuit includes an analog subtractor $SUB_1$ having a pair of input terminals one of which is connected to the F-number setter AO and the other of which is connected to input terminals $J'_2$ to receive from flash unit E an aperture control signal with a magnitude dependent upon the guide number of flash unit E, a switch $AS_3$ having a control input terminal connected to the interconnection input terminal $J'_1$ so that when the voltage of an energy storage capacitor for a flash tube has reached a critical level, switch $AS_3$ is set from its "a" position to its "b" position, a light-emitting diode $LED_2$ located behind a window 83 in the finder and responsive to the charge terminating signal from the input terminal $J'_1$ to be lighted on, and a timer TROM having an output terminal connected to an input terminal of gate $GL_3$, so that when the charge-terminating signal is applied to gate $GL_3$ through the terminals $J_1$-and-$J'_1$ connection, the period of actuation of solenoid TT is adjusted to a particular exposure time suitable for flash photography.

The power supply control circuit is provided for saving the amount of electrical energy of a battery $E_0$ which would be otherwise used up wastefully. The battery $E_0$ has a negative terminal which is grounded and has a positive terminal which is connected to the battery testing circuit through an interconnection terminal $E'_0$, therefrom connected through switch $S_{14}$ to the input terminal of a third switching circuit $E_3$, therefrom connected through switch $S_{15}$ to the input terminal of a first switching circuit $E_1$, therefrom connected directly to the input terminal of a second switching circuit $E_2$, and therefrom connected directly to a fourth interconnection terminal $E'_4$ and to the monostable multivibrator $M_1$. The output terminal $E'_1$ of first switching circuit $E_1$ is connected to sensor B, various exposure control parameter setters from S down to AO, converters $AD_1$ and $AD_2$ and adders $ADD_1$ and $ADD_2$. The output terminal $E'_2$ of second switching circuit $E_2$ is connected to solenoid MA controlling operation of the diaphragm. The output terminal $E'_3$ of third switching circuit $E_3$ is connected so solenoid MT controlling operation of the rear shutter curtain. The fourth output terminal $E'_4$ is connected through a resistor $R_1$ to a capacitor $CO_1$ for rapid energization of solenoid MR, and connected to ground through a resistor $R_2$ and $S_{12}$ connected in series with each other, and further through a resistor $R_3$ and switch $S_{16}$ connected in series with each other.

The first switching circuit comprises a transistor $Tr_4$ having an input electrode and having a base electrode connected to ground through a resistor $R_4$ and switch $S_{11}$ connected in series with each other so that when shutter button 47 is depressed by the first stroke to close switch $S_{11}$, transistor $Tr_4$ is rendered conducting. The collector electrode of transistor $Tr_4$ serves as the output terminal $E'_1$ and is connected through a delay circuit $TM_3$ having time response characteristics of 2 to 3 msec. to the reset input terminal of a flip-flop $F_1$. Flip-flop $F_1$ is rendered conducting in response to the closure of switch $S_{11}$ and remains in the set position for 2 to 3 msec. during which transistor $Tr_4$ is maintained in the "on" state by the output from flip-flop $F_1$ through an inverter $I_{21}$. When the front curtain runs down to open switch $S_{15}$, flip-flop $F_1$ is rendered inoperative. The second switching circuit comprises two transistors $Tr_2$ and $Tr_3$, transistor $Tr_2$ having an emitter electrode connected to the positive bus and having a collector electrode connected to the base electrode of transistor $Tr_3$, and transistor $Tr_3$ having a collector electrode connected to the base electrode of transistor $Tr_2$ and having an emitter electrode connected to the output terminal $E'_2$ and also connected through a delay circuit $TM_2$ to the base electrode of a transistor $Tr_5$ constituting part of third switching circuit $E_3$. The base electrode of transistor $Tr_2$ is also connected through an inverter $I_{20}$ to the output terminal of an AND gate $G_8$ having a pair of input terminals, one of which is connected through an inverter $I_4$ to a point on the connection between resistor $R_2$ and switch $S_{12}$, and the other of which is connected through series-connected inverters $I_5$ and $I_6$ to a point on the connection between resistor $R_3$ and switch $S_{16}$, so that when self-timer actuating switch $S_{16}$ is opened and when shutter button 47 is depressed from the first to the second stroke to close switch $S_{12}$, transistor $Tr_2$ is rendered conducting. The delay circuit $TM_2$ has time response characteristics of about 10 msec. Accordingly, after a time interval of about 10 msec. from the initiation of conduction of transistor $Tr_2$, the third switching circuit $E_3$ is rendered conducting. In the case where switch $S_{16}$ is closed, an AND gate $G_9$ having a pair of input terminals one of which is connected to a point on the connection between inverters $I_5$ and $I_6$ and the other of which is connected to the output terminal of inverter $I_4$ produces an output in response to the closure of switch $S_{12}$. The output of gate $G_9$ is applied to the set input terminal of flip-flop $F_1$, causing production of an output therefrom which is then applied to the gating control input terminal of a gate $G_{11}$, thereby a clock pulse train is passed through gate $G_{11}$ to a delay circuit $TM_1$ having time response characteristics of about 10 sec. Accordingly, after a time interval of about 10 seconds from the closure of switch $S_{12}$, second switching circuit $E_2$ is rendered conducting. The third switching circuit comprises the transistor $Tr_5$ having an emitter electrode connected to the positive bus, and a transistor $Tr_6$ having a collector electrode connected to the base electrode of transistor $Tr_5$ and having a base electrode connected to the collector electrode of transistor $Tr_5$. The emitter electrode of transistor $Tr_6$ serves as the output terminal $E'_3$ and is connected to one input terminal of a gate $G_{12}$ constituting part of a control circuit for the light-emitting diode $LED_4$.

Figure 6:
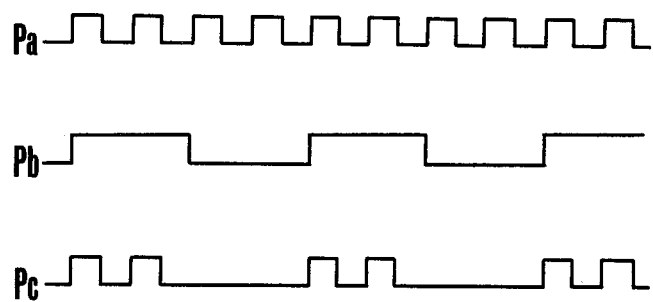
FIG. 6 is a timing chart of pulses with which the warning circuit of FIG. 5 may be operated.

The control circuit for controlling the driving mode of diode $LED_4$ comprises four gates $G_{10}$, $G_{12}$, $G_{13}$ and $G_{14}$ and a buffer amplifier $B_4$ connected between a common output terminal of gates $G_{12}$, $G_{13}$ and $G_{14}$ and the positive pole of diode $LED_4$ having a grounded negative pole. Gates $G_{12}$, $G_{13}$ and $G_{14}$ have a common input terminal connected to a stage of counter 3 different from that connected to an input terminal of gate $G_{10}$, and are supplied with a pulse train of wave form Pb of FIG. 6, while gate $G_{10}$ is supplied with a pulse train of wave form Pa. The output terminal of gate $G_{10}$ is connected to an input terminal of gate $G_{13}$, and the output terminal of a comparator $C_6$ constituting part of the battery testing circuit is connected to an input terminal of gate $G_{14}$. With this arrangement, when switch $S_{16}$ is closed to set the camera to the self-timer exposure control mode, gate $G_{10}$ is gated on to pass the pulse train Pa to gate $G_{13}$. The closure of switch $S_{16}$ causes flip-flop $F_1$ to be rendered operative to produce an output which is then applied to gate $G_{13}$, thereby gate $G_{13}$ is gated on to pass a pulse train of waveform Pc to diode $LED_4$ through buffer amplifier $B_4$. When switch $S_{16}$ is opened to render inoperative flip-flop $F_1$, gate $G_{12}$ is gated on by the output of second switching circuit $E_2$ to pass the pulse train of wave form Pb to diode $LED_4$ through buffer amplifier $B_4$. Therefore, it is possible for the photographer to distinguish which of the self-timer exposure and relatively long exposure is made. When switch $S_{17}$ of battery testing circuit is closed, gate $G_{14}$ is gated on by the output of comparator $C_6$ to pass the pulse train of wave form Pb to diode $LED_4$ through buffer amplifier $B_4$ so long as the voltage of battery $E_0$ remains above a pre-determined level.

The battery testing circuit comprises the comparator $C_6$ having a pair of input terminals one of which is connected to the output terminal $E'_0$ and the other of which is connected to a voltage divider containing resistors $R_5$ and $R_6$ connected in series with each other and connected between the output terminal $E'_0$ and ground through switch $S_{17}$.

The control circuit for controlling operation of solenoid MR comprises a capacitor $CO_1$ serving as an instantaneous electrical energy supply source and connected at one plate thereof through resistor $R_1$ to the output terminal $E'_4$ of battery $E_0$, the opposite plate of which is connected to ground, a transistor $Tr_1$ having a collector electrode connected through solenoid MR to a point on the connection between resistor $R_1$ and capacitor $CO_1$ and having a grounded emitter electrode, a gate $G_7$ having an output terminal connected to the base electrode of transistor $Tr_1$ and having an input terminal connected through a interconnection terminal $J_7$ to the output terminal $E'_3$ of third switching circuit $E_3$. Gate $G_7$ has two gating control input terminals, one of which is connected to an output terminal of a flip-flop $F_2$ having a "set" input terminal connected through an interconnection terminal $J_8$ and $J_6$ to the output terminal of comparator $C_5$ so that, when the light level of a given photographic situation is below the dynamic range of exposure control, gate $G_7$ is gated off, and the other of which is connected to an output terminal of a flip-flop $F_3$ having a "set" input terminal connected through interconnection terminals $J_9$ and $J_3$ to the output terminal of a gate $G_0$ so that, when the diaphragm ring 1 is set to the "EE" position and when the sector 18 is in a released position, gate $G_0$ produces an output which causes flip-flop $F_3$ to gate off the gate $G_7$. Gate $G_0$ has a pair of input terminals, one of which is connected to diaphragm preselection responsive signal generator AA and the other of which is connected through an inverter $I_0$ to diaphragm auto-controllability detector AE. Flip-flops $F_2$ and $F_3$ are resettable by the output of first switching circuit $E_1$ when shutter button 47 is depressed by the first stroke.

Figure 7:
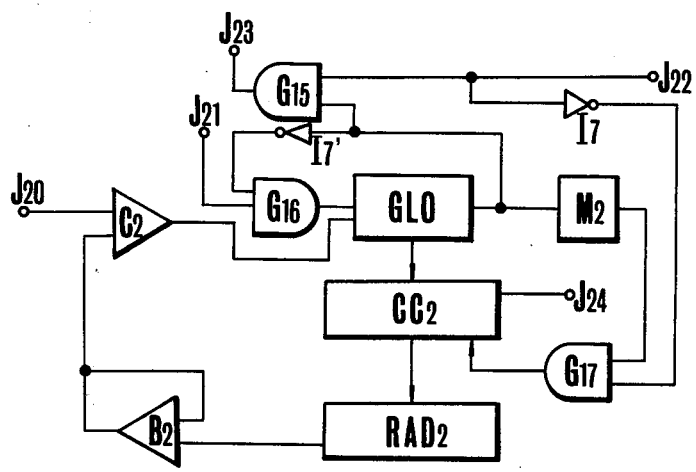
FIG. 7 is a block diagram showing another example of the digital-to-analog converter useable in block $AD_2$ of FIG. 5.

FIG. 7 shows an example of modification of the second analog-to-digital converter $AD_2$ of FIG. 5 adapted to the purpose of actuating the electronic switch or transistor $Tr_1$ controlling the period of actuation of solenoid MR in automatic response to a simultaneous occurrence of a light value-setting signal and a sensor-blocking signal and of automatically effecting a correct exposure based on the light value stored in the digital form at the time of actuation of transistor $Tr_1$ or solenoid MR. To achieve this purpose, there are provided three AND gates $G_{15}$, $G_{16}$ and $G_{17}$, two inverters $I_7$ and $I'_7$, and a multivibrator $M_2$ in addition to a gate $GL_0$, counter $CC_2$, ladder-type resistor network $RAD_2$, comparator $C_2$ and buffer amplifier B similar in construction, arrangement and function to those of FIG. 5 having the corresponding reference characters. The input terminal $J_{20}$ of comparator $C_2$ is connected to the output terminal of adder $ADD_1$. Gate $G_{15}$ has a pair of input terminals one of which termed $J_{22}$ is connected to the output terminal $E'_2$ of second switching circuit $E_2$ to receive a sensor-blocking signal when sensor B is cut off from the power supply source by second switching circuit $E_2$, and the other of which is connected to the output terminal of gate $GL_0$ to receive a light value-setting signal therefrom. Responsive to a simultaneous occurrence of the sensor-blocking signal and the light value-setting signal, gate $G_{15}$ produces an output which is applied to gate $G_7$ through the terminals $J_{23}$-and-$J_7$ connection. A clock pulse train from terminal $J_{21}$ is passed through gate $G_{16}$ to gate $GL_0$ until the light-value setting signal after inverted by inverter $I_7$ is applied to gate $GL_0$. Multivibrator $M_2$ serves as a delay means, and has an input terminal connected to the output terminal of gate $GL_0$, and has an output terminal connected to the one input terminal of gate $G_{17}$ opposite to that connected through inverter $I_7$ to terminal $J_{22}$. Responsive to the light value setting signal from gate $GL_0$, multivibrator $M_2$ produces a counter-resetting signal after a time interval from the advent of the light value setting signal thereon. As a result, the counter $CC_2$ is set and then reset in sequence, thereby it being made possible to determine the light value occurring at any time with high accuracy as the light value sensed by the sensor S tends to vary with time and with photographic situation. Such a sequential setting and resetting operation of counter $CC_2$ repeats itself until the sensor-blocking signal is applied through inverter $I_7$ to gate $G_7$ to preserve the counting state of counter $CC_2$. The output terminal $J_{24}$ of counter $CC_2$ is connected to gate $GL_3$.

Figure 8:
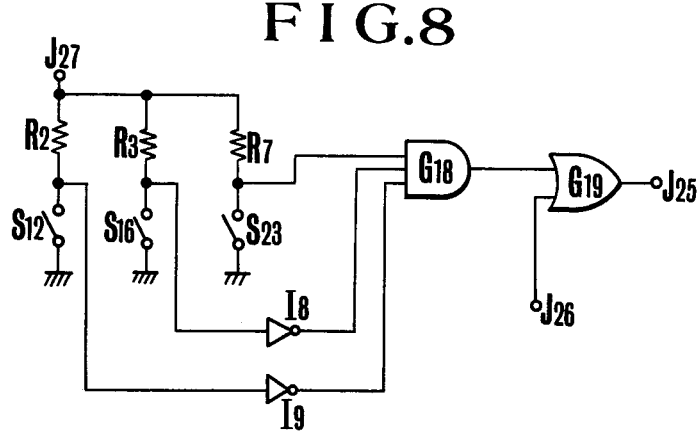
FIG. 8 is a block diagram of a camera release control circuit useable with the circuit of FIG. 5.

In making an exposure in the self-timer exposure control mode using the eye-piece shutter 62, it is necessary to modify the period of actuation of solenoid MR as depending upon whether or not the eye-piece shutter 62 is in the active position. FIG. 8 shows an electrical circuit for accomplishing this purpose in cooperation with the circuit of FIG. 7. Whilst the input terminal $J_{22}$ of FIG. 7 is directly connected to the output terminal $E'_2$ of second switching circuit $E_2$, the output terminal $J_{25}$ of FIG. 8 which is connected directly to the input terminal $J_{22}$ of FIG. 7 is connected to the output terminal $E'_2$ of second switching circuit $E_2$ through an OR gate $G_{19}$ at one input terminal thereof termed $J_{26}$, the other terminal of which is connected to the output terminal of an AND gate $G_{18}$. Gate $G_{18}$ has two gating control input terminals one of which is connected to a point on the connection between a resistor $R_7$ and switch $S_{23}$ associated with the eye-piece shutter 62, the other of which is connected through an inverter $I_8$ to a point on the connection between the resistor $R_3$ and switch $S_{16}$ associated with the self-timer circuit, and has an input terminal which is connected to a point on the connection between the resistor $R_2$ and switch $S_{12}$ which is closed when shutter button 47 is depressed from the first stroke to the second. Assuming now that eye-piece shutter 62 is in the active position where switch $S_{23}$ is closed and that an exposure is made with use of the self-timer, that is, switch $S_{16}$ is closed, when shutter button 47 is depressed from the first stroke to the second to close switch $S_{12}$, gate $G_{18}$ produces no output so that the period of actuation of solenoid MR is controlled by the sensor-blocking signal supplied from the terminal $J_{26}$ through OR gate $G_{19}$. Alternatively assuming that eye-piece shutter 62 remains in the idle position wherein switch $S_{23}$ is opened and that switch $S_{16}$ is closed, when shutter button 47 is depressed to close switch $S_{12}$, gate $G_{18}$ produces an output which is applied through OR gate $G_{19}$ to the transistor $Tr_1$, so that counter $CC_2$ of FIG. 7 is set to a counting state, based on which the exposure control is to be made. The input terminal $J_{27}$ of the circuit of FIG. 8 is adapted for connection to the output terminal $E'_4$ of battery $E_0$.

Figure 9:
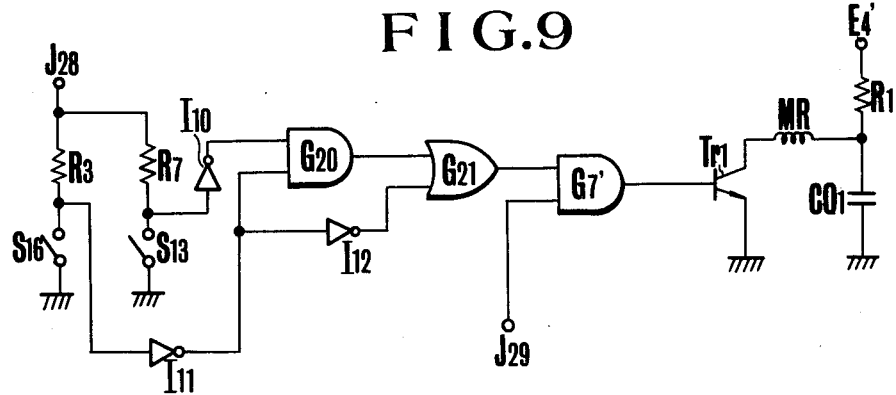
FIg. 9 is a block diagram of another example of the camera release control circuit of FIG. 8 associated with an eye-piece shutter control switch.

FIG. 9 shows an electrical circuit for controlling operation of solenoid MR in such a manner that the self-timer operated exposure is possible only when eyepiece shutter 62 is in the active position, and further that any one of the operating ranges without using the self-timer is possible regardless of the position of eye-piece shutter 62. The base electrode of transistor $Tr_1$ is connected to the output terminal of an AND gate $G'_7$ having two input terminals, one of which termed $J_{29}$ is connected to the second switching circuit output $E'_2$ of FIG. 5, or the output terminal $J_{23}$ of FIG. 7, and the other of which is connected to an OR gate $G_{21}$. Gate $G_{21}$ has two input terminals, one of which is connected through two series-connected inverters $I_{11}$ and $I_{12}$ to a point on the connection between the resistor $R_3$ and switch $S_{16}$, so that when switch $S_{16}$ is opened, gate $G_{21}$ passes an output to gate $G'_7$ therethrough, and the other of which is connected to the output terminal of an AND gate $G_{20}$ having two input terminals one of which is connected to a point on the connection between inverters $I_{11}$ and $I_{12}$, and the other of which is connected through an inverter $I_{10}$ to a point on the connection between resistor $R_7$ and switch $S_{23}$, so that only when switch $S_{23}$, so that only when switch $S_{23}$ is closed, an output is caused to appear at the output terminal of gate $G_{20}$ by the closure of switch $S_{16}$.

Figure 10:
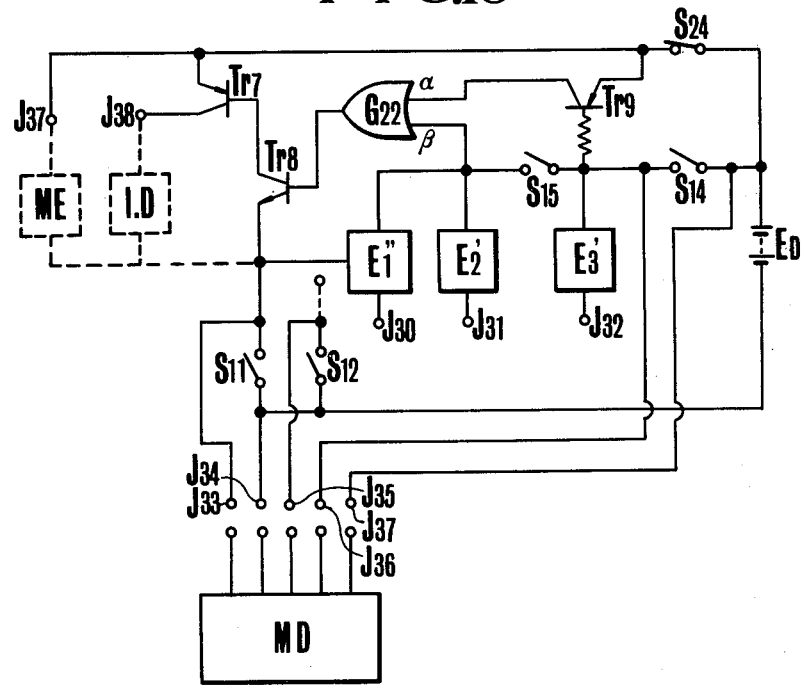
FIG. 10 is a schematic diagram, partially in block form, of another example of the display control circuit of FIG. 5.

FIG. 10 shows an example of modification of the power supply control circuit for the display device of FIG. 5. With the circuit of FIG. 5, it is impossible to review the display after the termination of exposure, because the display device is made inoperative by the opening of switch $S_{15}$ caused by the running-down movement of the front shutter curtain. In some cases, however, it is desired to take the record of photographic data concerning to the preceeding exposure. It has been the practice of the prior art in achieving this purpose to utilize switch $S_{11}$ as a control switch of the display device. This arrangement of switch $S_{11}$ is disadvantageous from the economical point of view, as the display device must be energized during the entire exposure operation. According to the present invention, therefore, the control circuit of the display device is so designed that the photographic data of information is stored in a memory register during the exposure operation and is displayed again after the termination of the exposure, so long as switch $S_{11}$ is closed. The memory register is designated at ME, and is shown as connected between the positive and negative terminals of battery $E_0$ through switch $S_{11}$. The various components of the display device other than the memory register ME are designated at ID and is shown as connected at one input terminal thereof to the output terminal of a switching circuit of which operation is controlled by the output of an OR gate $G_{22}$. This switching circuit comprises two transistors $Tr_7$ and $Tr_8$, transistor $Tr_7$ having an emitter electrode connected to the positive terminal of battery $E_0$ through a manually operable switch $S_{24}$ which may be opened when the display is not necessary, and having a collector electrode connected to the input terminal of the display component assembly ID and transistor $Tr_8$ having a collector electrode connected to the base electrode of transistor $Tr_7$, having an emitter electrode connected to switch $S_{11}$ and having a base electrode connected to the output terminal of OR gate $G_{22}$. OR gate $G_{22}$ has two input terminals, one of which termed "beta" is connected through series-connected switches $S_{15}$ and $S_{14}$ to the positive terminal of battery $E_0$ and the other of which termed "alpha" is connected to the collector electrode of a transistor $Tr_9$ having an emitter electrode connected through switch $S_{24}$ to the positive terminal of battery $E_0$ and having a base electrode connected to a point on the connection between switches $S_{15}$ and $S_{14}$, so that when the front shutter curtain runs down to open switch $S_{15}$, the display component assembly I.D is rendered inoperative, and then when the rear curtain runs down to open switch $S_{14}$, the display component assembly is again rendered operative. It is to be understood that the display component assembly I.D is inoperative during the exposure so long as the switch $S_{11}$ is closed, while the memory register ME being maintained operative throughout. Terminals $J_{30}$, $J_{31}$ are output terminals of switching circuits $E''_1$, $E'_1$ and $E'_3$ respectively similar to those of FIG. 5 having the corresponding reference characters without primes. A block designated by MD is a motor drive unit serving as an attachment unit for the camera and having five interconnection terminals arranged to be connectable with respective interconnection terminals $J_{33}$ through $J_{37}$ provided on the camera housing. Terminal $J_{33}$ is connected to the fixed contact of switch $S_{11}$, terminal $J_{34}$ to both of the movable contacts of switches $S_{11}$ and $S_{12}$, and terminal $J_{35}$ to the fixed contact of switch $S_{12}$. Terminals $J_{36}$ and $J_{37}$ are connected to the fixed and movable contacts of switch $S_{14}$ respectively.

The resistor ME corresponds to La in FIG. 5. The indication device ID corresponds to 71, $LED_1$, $LED_2$, $LED_3$, and 70 and their related circuits Dc, $D_2$, $G_4$, $G_2$, $G_3$, $G_5$, $G_6$, $ADD_2$ and $I_3$ in FIG. 5. MD is a conventional motor drive device, which performs the film winding up by the change-over of the switch 14 when the exposure is completed.

FIG. 11 is a fragmentary diagram of the circuit for controlling the shutter of the camera in accordance with a particular aperture value when shutter dial 50 and diaphragm ring 1 are accidentally set to the "AUTO" and "EE" positions respectively at the same time. Under this situation, the circuit of FIG. 5 operates with the maximum possible aperture value. In order to increase the percentage of photographs taken by under this situation which will be found acceptable, however, it is preferred for the camera to operate with an aperture value of high frequency in use. In this case, the warning display and safety mechanism becomes effective so that the photographer looking through the finder will sometimes aware the missetting of the camera. The circuit of FIG. 11 includes an analog switch $AS_4$ of which operation is controlled by the output of a gate $G_{23}$ having two input terminals one of which is connected to shutter preselection responsive signal generator TA, and the other of which is connected to diaphragm preselection responsive signal generator AA, so that when shutter dial 50 and diaphragm ring 1 are simultaneously set in the "AUTO" and "EE" positions respectively, signals from generators TA and AA are passed through gate $G_{23}$ to the control input terminal of switch $AS_4$ thereby switch $AS_4$ is set from its "a" position to its "b" position where a particular aperture value setter AROM is connected to adder $ADD_1$, while the shutter time and diaphragm value setters T and A are cut off from adder $ADD_1$, permitting the combined exposure control circuit of FIGS. 5 and 11.

90 indicates a system for controlling and indicating the shutter time, 71, $LED_1$, La, DC, $D_2$ in FIG. 5 represent the indication system and MT, $C_3$ and $CC_4$ represents the controlling system.

100 is a system for indicating and controlling the diaphragm; 70 and $ADD_2$ in FIG. 5 represent the indication system and MA, C₄ represent the controlling system.

What is claimed is:

1. An automatic exposure control apparatus for a single lens reflex camera comprising:
   (a) manually adjustable shutter time setting means having a signal generator arranged upon setting of a shutter time to produce an electrical signal with a magnitude proportional to said shutter time;
   (b) an objective lens of said camera;
   (c) diaphragm means having a range of sizes of the aperture for said objective lens;
   (d) light value sensing means having a photosensitive element arranged upon receiving scene light entering through said objective lens with the full-size aperture of said diaphragm means to produce an electrical signal with a magnitude proportional to the intensity of said scene light;
   (e) automatically adjustable setting means for said diaphragm means adapted to select an aperture value as the function of said shutter time and said scene light intensity;
   (f) adjusting means for said automatically adjustable setting means having a signal generator arranged upon operative association of said adjusting means with said setting means to produce an electrical signal with a magnitude proportional to the aperture value selected as the function of the position of said setting means;
   (g) pulse generating means;
   (h) digital-to-analog pulse generating means upon counting of the number of pulses supplied therefrom to produce an electrical signal with a time variable magnitude proportional to said number of pulses;
   (i) first comparing means receptive of the electrical signals from said light value sensing means and said digital-to-analog converting means and responsive to the establishment of a predetermined relationship between the magnitudes of said electrical signals for producing an electrical output signal;
   (j) gating means connected between said pulse generating means and said counter upon advent of the output signal from said first comparing means thereon to stop the passage of pulses to said counter therethrough;
   (k) second comparing means receptive of the electrical signals from said adjusting means and said digital-to-analog converting means and responsive to the establishment of a predetermined relationship between the magnitudes of said electrical signals for producing an electrical output signal;
   (l) arresting means for said adjusting means arranged upon advent of the output signal from said second comparing means thereon to arrest said adjusting means at a position dependent upon said shutter time and said scene light intensity as said adjusting means is moved from the maximum to minimum possible aperture position;
   (m) driving means causing said diaphragm means to be brought into effective exposure aperture-determining engagement with said setting means;
   (n) actuating means for actuating said driving means and said adjusting means synchronously with each other in response to the release of said camera; said apparatus further including:
   (o) manually adjustable diaphragm setting means operatively connected to said automatically adjustable diaphragm setting means and having a signal generator arranged upon setting of a diaphragm aperture value to produce an electrical signal with a magnitude proportional to said aperture value;
   (p) first change-over means for selecting either said shutter time setting means or said manually adjustable diaphragm setting means for cooperation with said first comparing means;
   (q) control means for controlling the shutter of said camera, said control means having:
      (1) a first timer cooperative with said shutter setting means for providing a delay time corresponding to the shutter time selected on said shutter time setting means,
      (2) a second timer cooperative with said digital-to-analog converting means for providing a time delay corresponding to the output signal of said digital-to-analog converting means, and
      (3) selecting means for selectively rendering operative said first and said second timer; and
   (r) second change-over means for selecting either said second comparing means or said shutter control means for cooperation with said digital-to-analog converting means.

2. An automatic exposure control apparatus for a camera comprising:
   (a) manually adjustable shutter time setting means having a signal generator arranged upon setting of a shutter time to produce an electrical signal with a magnitude proportional to said shutter time;
   (b) an objective lens of said camera;
   (c) diaphragm means having a range of sizes of the aperture for said objective lens;
   (d) light sensing means having a photosensitive element arranged upon receiving scene light to produce an electrical signal with a magnitude proportional to the intensity of said scene light;
   (e) automatically adjustable setting means for said diaphragm means adapted to select an aperture value as the function of said shutter time and said scene light intensity;
   (f) adjusting means for said automatically adjustable setting means having a signal generator arranged upon operative association of said adjusting means with said adjustable setting means to produce an electrical signal with a magnitude proportional to the aperture value selected as the function of the position of said adjustable setting means;
   (g) pulse generating means;
   (h) digital-to-analog converting means having a counter responsive to said pulse generating means upon counting of the number of pulses supplied therefrom to produce an electrical signal with a time variable magnitude proportional to said number of pulses:
   (i) first comparing means receiving the electrical signals from said light value sensing means and said digital-to analog converting means and responsive to the establishment of a predetermined relationship between the magnitudes of said electrical signals for producing an electrical output signal;
   (j) gating means connected between said pulse generating means and said counter upon advent of the output signal from said first comparing means to stop the passage of pulses to said counter therethrough;
   (k) second comparing means responsive to the electrical signals from said adjusting means and said digital-to-analog converting means and responsive to the establishment of a predetermined relationship between the magnitudes of said electrical signals for producing an electrical output signal;

(l) arresting means for said adjusting means arranged upon advent of the output signal from said second comparing means thereon to arrest said adjusting means at a position dependent upon said shutter time and said scene light intensity as said adjusting means is moved from the maximum to minimum possible aperture position;

(m) actuating means for actuating said adjusting means in response to the release of said camera;

(n) manually adjustable diaphragm setting means operatively connected to said automatically adjustable diaphragm setting means and having a signal generator arranged upon setting of a diaphragm aperture value to produce an electrical signal with a magnitude proportional to said aperture value;

(o) shutter control means for controlling the shutter opening and closing time in correspondence to one of the electrical signal output of the shutter time setting means and the electrical signal output of the digital-analog conversion means;

(p) change-over means for selecting one of said shutter time setting means and said manually adjustable diaphragm setting means for cooperation with said first comparing means, and for selecting one of said second comparing means as said shutter control means for cooperation with said digital-to-analog converting means.

3. An automatic exposure control apparatus according to claim 2, which further comprises:

(1) a first timer cooperative with said shutter time setting means for providing a delay time corresponding to the shutter time selected on said shutter time setting means (2) a second timer cooperative with said digital-to-analog converting means for providing a time delay corresponding to the output signal of said digital-to-analog converting means; and (3) selecting means for selectively rendering operative said first and said second timer.

4. An automatic exposure control apparatus according to claim 2, in which the light sensing means, the shutter time setting means and the diaphragm setting means have respectively logarithmic compression means to generate a logarithmically compressed electrical signal.

5. An automatic exposure control apparatus according to claim 2, wherein said first comparing means includes a comparator and a reference voltage generator, said comparator receiving as the first input voltage of the output signal of said reference voltage generator and as the second input voltage of the sum of the output signals of said shutter time setting means, said light value sensing means and said digital-to-analog converting means.

6. An automatic exposure control apparatus according to claim 2, wherein said second comparing means includes a comparator and a reference voltage generator, said comparator receiving as the first input voltage of the output signal of said reference voltage generator and as the second input voltage of the sum of the output signals of said adjusting means and said digital-to-analog converting means.

7. An automatic exposure control apparatus according to claim 2, further including temperature compensating means cooperating with said light sensing means for maintaining constant the magnitude of output signal of said light value sensing means at any light level despite variation in ambient temperature.

8. An automatic exposure control apparatus according to claim 2, further including: delaying means connected between said shutter control means and said actuating means for actuating said shutter control means after a predetermined time interval from the initiation of operation of said actuating means.

9. An automatic exposure control apparatus according to claim 2, in which the actuating means has an electromagnet which controls the operation of the actuating means.

10. An automatic exposure control apparatus according to claim 2, which further comprises: a first indicating means for indicating a shutter-time preference mode, and a second indication means for indicating a diaphragm preference mode, one of the first indication means and the second indication means being illuminated depending on the change-over of the change-over means.

11. An automatic exposure control apparatus according to claim 2, which further comprises a detection means for detecting whether the change-over means is in a completely changed-over state, which means makes non-operative the actuating means when it detects the change-over means is not completely changed over.

12. An automatic exposure control apparatus according to claim 2, which further comprises:
means for operating the actuating means;
a self-timer provided between the actuating means and the operation means, which self-timer actuates the actuating means after a predetermined time by the operation of the operation means.

13. An automatic exposure control apparatus according to claim 2, which further comprises:
a finder having an eye-piece;
an eye-piece shutter provided on the eye-piece, which prevents the light from returning to the finder; and
means for actuating the actuating means, which operates in association with the operation of the eye-piece shutter.

* * * * *